US005471659A

United States Patent [19]
Wong

[11] Patent Number: 5,471,659
[45] Date of Patent: Nov. 28, 1995

[54] DUAL RADIO

[76] Inventor: Danny C. Y. Wong, 222 Littlefield Ave., South San Francisco, Calif. 94080

[21] Appl. No.: 96,223

[22] Filed: Jul. 26, 1993

[51] Int. Cl.[6] .................................................. H04B 1/38
[52] U.S. Cl. .......................... 455/132; 455/347; 455/350; 455/351; 455/149
[58] Field of Search ...................................... 455/344, 347, 455/348, 349, 350, 351, 346, 132, 140, 142, 143, 144, 149, 345, 63, 219, 200.1; 381/1, 2, 17, 11, 24

[56] References Cited

U.S. PATENT DOCUMENTS

| | | | |
|---|---|---|---|
| 3,054,024 | 9/1962 | Dillen et al. | 455/349 |
| 4,046,973 | 9/1977 | Sato | 455/344 |
| 4,396,941 | 8/1983 | Nishimura et al. | 455/347 |
| 4,491,979 | 1/1985 | Ogasawara et al. | 455/347 |

FOREIGN PATENT DOCUMENTS 52-15311  2/1977  Japan ..................................... 455/344

*Primary Examiner*—Reinhard J. Eisenzopf
*Assistant Examiner*—Doris To
*Attorney, Agent, or Firm*—Steven G. Roeder; Sheldon & Mak, Inc.

[57] ABSTRACT

A combination radio (10) is provided for enabling the user to listen to two independent radio stations at one time. Alternatively, the combination radio (10) can be tuned into the same radio frequency to allow the user to combine the sound output from each individual radio. Moreover, additional radios can be added to the combination radio to increase the sound output of the system.

17 Claims, 3 Drawing Sheets

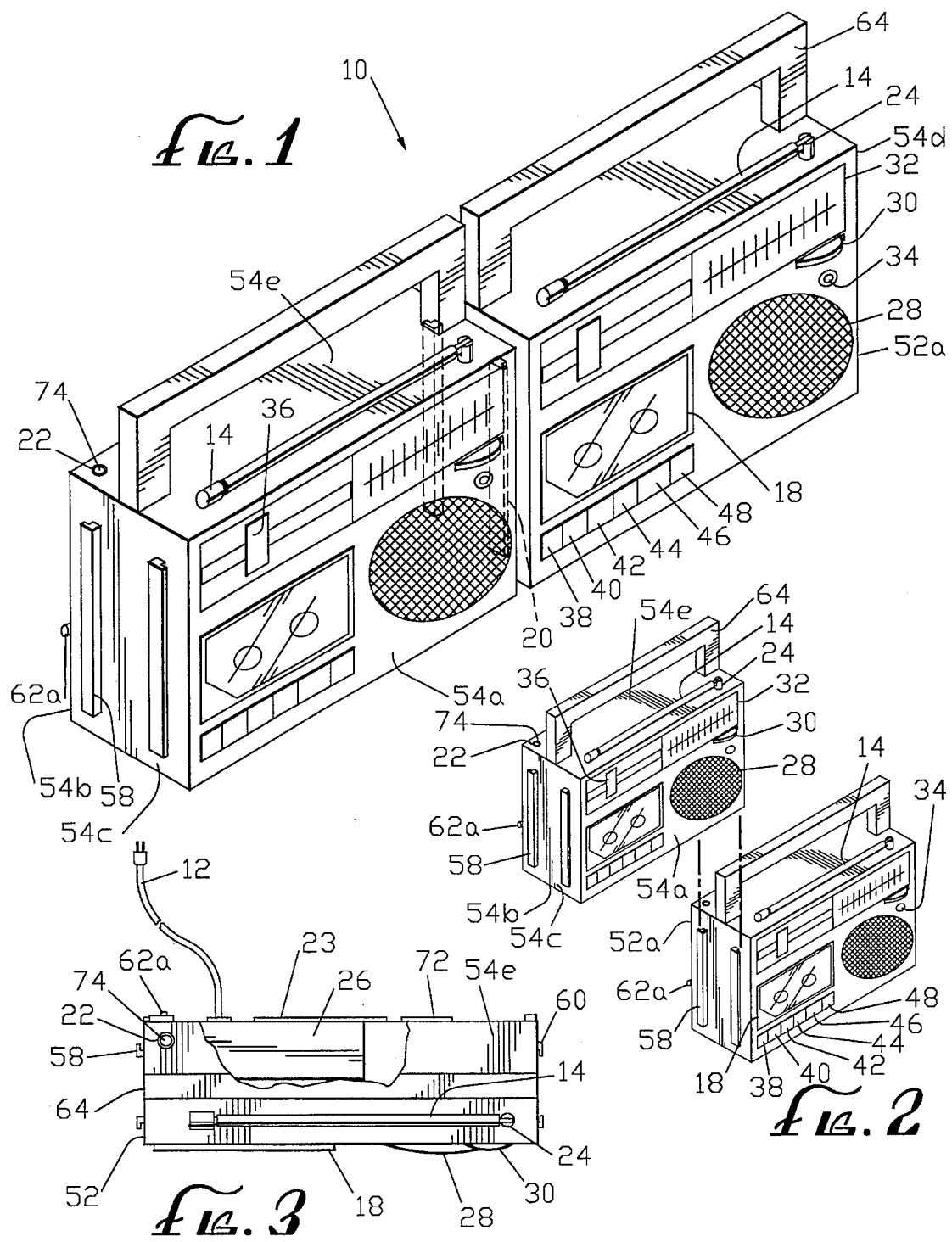

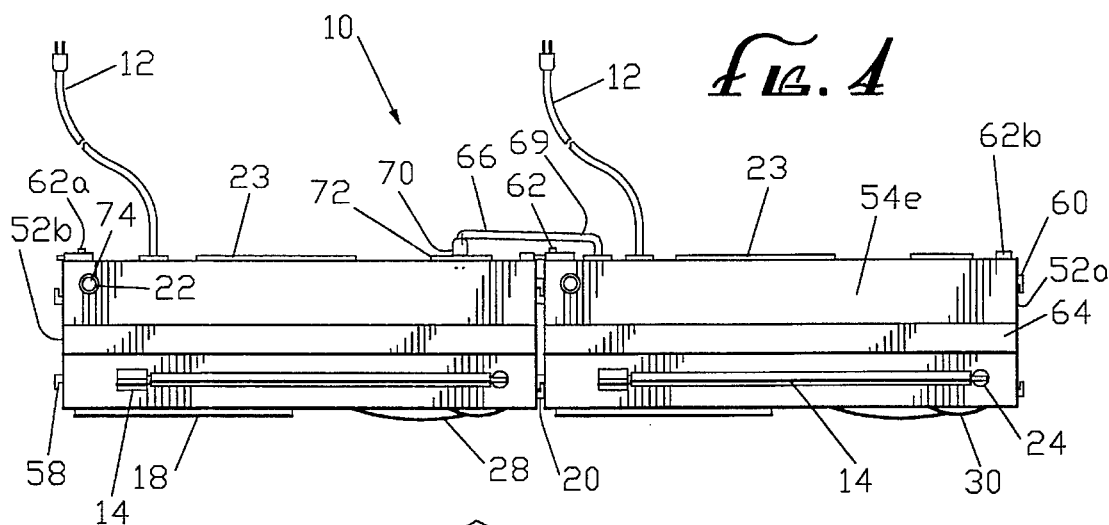
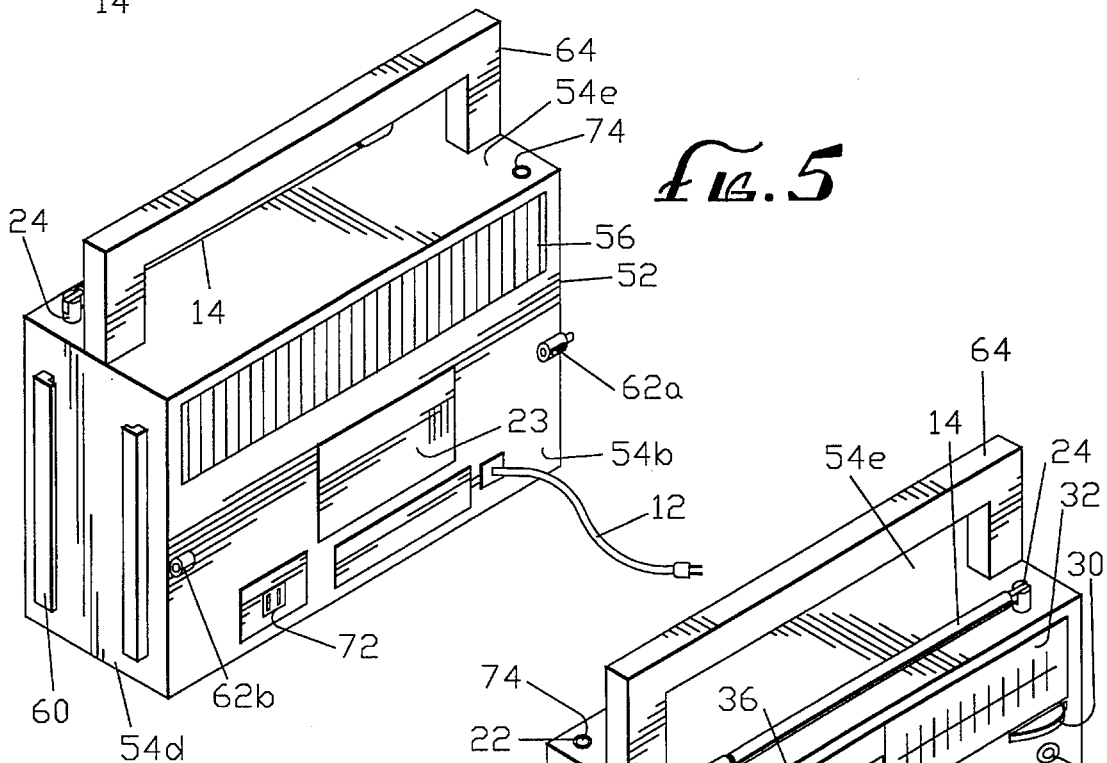

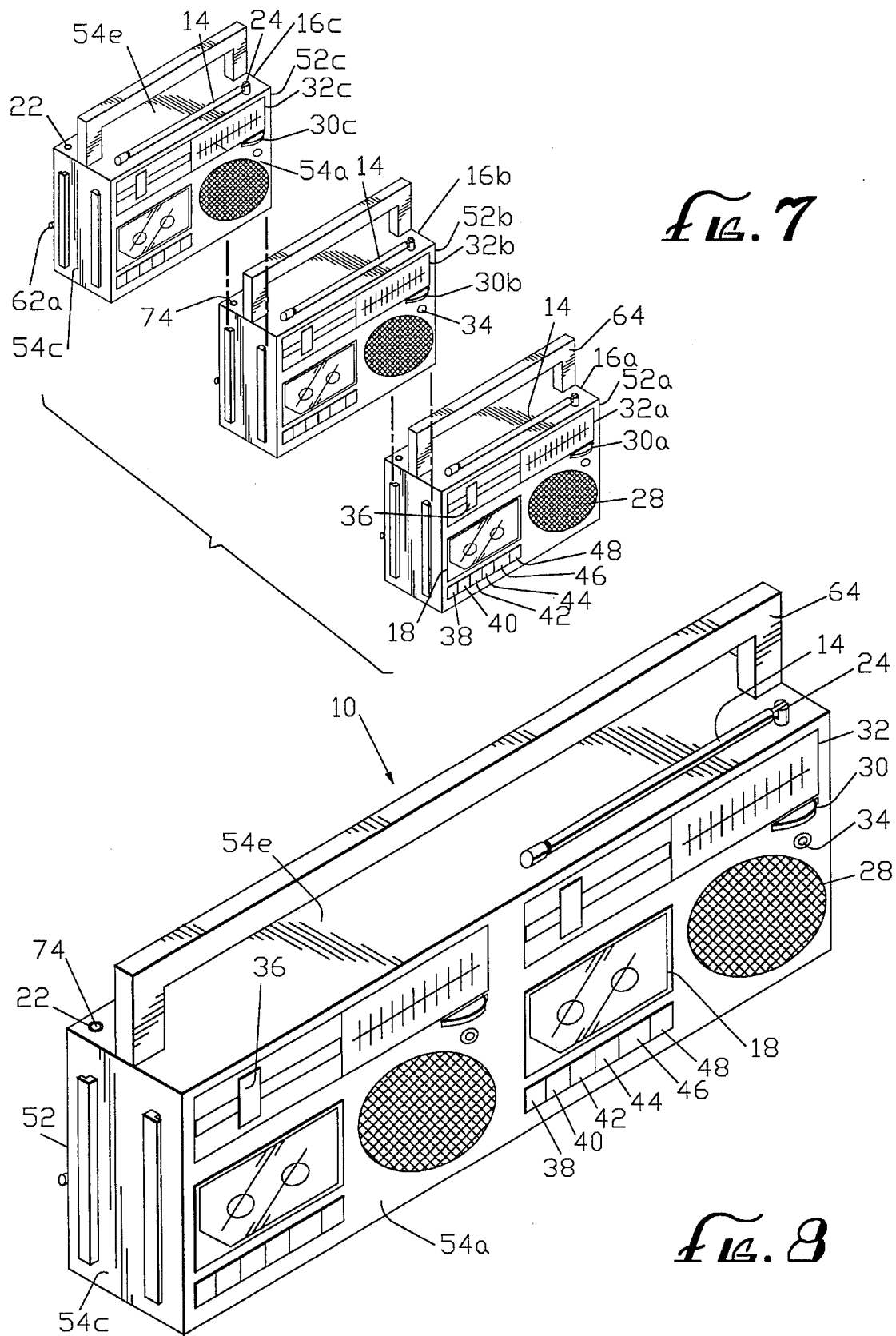

DUAL RADIO

BACKGROUND

The present invention is directed to a radio.

Radio receivers are commonly used throughout the world. The typical radio receiver can be tuned to receive only one station at a time. Accordingly it is impossible to listen to two different stations at one time, i.e., a classical station and a traffic station, or a news station and a sports broadcast.

Moreover, the power output of the typical radio receiver is limited to a maximum volume. If the user is going to a loud open area, such as the beach and desires to have sound output greater than the maximum valve, a larger radio receiver or an amplifier must be purchased.

Accordingly, there is a need for a radio useful for allowing the listener to tune two separate stations at one time. Additionally, there is a need for a radio which allows the owner to increase the sound output from the radio without purchasing a new radio or an amplifier.

SUMMARY

The present invention is directed to a combination radio that satisfies these needs. The combination radio comprises two radios useful for listening to two separate stations at one time, or tuning in the same station to essentially double the sound output of each individual radio.

In one version of the invention, the combination radio comprises two radios sharing certain components and each having its own separate components. The shared components can be an electrical power input and an antenna. The separate components can be a radio receiver, a set of electronic controls, including a tuner control for tuning the radio receiver, and at least one speaker.

In this version of the invention, a combination radio having features of the present invention comprises an electrical power input, an antenna, a first independent electronic device, a second independent electronic device, and a housing for housing the first radio receiver, the first set of electronic controls, the second radio receiver, and the second set of electronic controls. The first and second electronic devices can each be independently tuned to receive the same or a different radio frequency, and each electronic device can independently generate audible sound. Each independent electronic device has a radio receiver, a set of electronic controls, including a tuner control for tuning the receiver, and at least one speaker.

At least one of the electronic devices can include an audible sound reproducer, i.e., a compact disc player, for reproducing audible sound from a recorded medium. The electrical power input can be at least one battery compartment capable of receiving a battery.

Preferably, the combination radio includes a synchronizer for synchronizing the two radio receivers on the frequency from the same radio station. This embodiment is preferred since the sound output of each independent radio receiver can be combined to essentially double the sound output of the combination radio.

The synchronizer can be a switch which bypasses the first tuner control of the first electronic device and causes both radio receivers to be operated by the second tuner control. Alternatively, the synchronizer can be a switch which bypasses the first set of electronic controls of the first electronic device and causes both electronic devices to be operated by the second set of electronic controls.

In an alternate version of the invention, the combination radio is actually two separate electronic devices having their own electrical power input and antenna. Each electronic device is housed in a separate housing, and an attacher is utilized to removably attach the two housings together. Additionally, a synchronizer can be used to synchronize the two radio receivers on a frequency from the same radio station.

In this version of the invention the combination radio comprises a first independent electronic device contained in a first housing and a second independent electronic device contained in a second housing removably attached together by an attacher. The combination radio includes a synchronizer for synchronizing the two radio receivers on the frequency from the same radio station.

The first and second electronic devices can each be independently tuned to receive the same or a different radio frequency and each electronic device can independently generate audible sound. Each independent electronic device has a radio receiver, a set of electronic controls, including a tuner control for tuning the receiver, at least one speaker, an electrical power input and an antenna.

The attacher can be a projection extending from the first housing and a corresponding receiver for receiving the projection extending from the second housing.

In this version of the invention, the combination radio can also include a third independent electronic device disposed in a third housing and the attacher is further capable of removably attaching the third housing to the first and second housings. The third electronic device can have a third radio receiver, an independent electronic power input, a third set of electronic controls, including a third tuner control for tuning the third radio receiver, an antenna, and at least one speaker. The third electrical device can also be independently tuned to receive the same or a different radio frequency and can independently generate audible sound. The synchronizer can be used in the combination radio for synchronizing the three radio receivers on a frequency from the same radio station so that the sound generated by these three electronic devices can be combined.

The present invention provides a combination radio which is useful for allowing the user to listen to two or more independent stations at one time. Moreover, the present invention provides a way to attach two or more radios and tune two or more radio receivers into the same frequency so that the potential sound output of the independent radios can be combined together to create one large radio for large parties or outdoor events.

DRAWINGS

These and other features, aspects and advantages of the present invention, will become better understood with reference to the following description, appended claims, and accompanying drawings where:

FIG. 1 is a perspective view of a combination radio embodying features of the present invention;

FIG. 2 is a perspective view of the combination radio of FIG. 1 separated into two radios;

FIG. 3 is a partially broken away top plan view of one of the electronic devices of FIG. 2;

FIG. 4 is a top plan view of the combination radio of FIG. 1;

FIG. 5 is a rear perspective view of the radio of FIG. 3;

FIG. 6 is a front perspective view of the radio of FIG. 3;

FIG. 7 is a perspective view of a combination radio featuring three independent radios separated; and FIG. 8 is a perspective view of a combination radio embodying features of the present invention.

DESCRIPTION

With reference to the figures, the present invention is directed to a combination radio 10 comprising: (a) an electrical power input 12; (b) an antenna 14; (c) first 16a, second 16b, and third 16c independent electronic devices 16; (d) an audible sound reproducer be; (e) an attacher 20; and (f) a synchronizer The electrical power input 12 to the combination radio 10 can be any device capable of receiving electrical power from a 110 volt A.C. power supply, a 220 volt A.C. power supply, any size battery or batteries (i.e., 9-volt battery), or any power supply capable of providing sufficient electrical power to the combination radio be. If only one electrical power input 12 is utilized, the power input 12 is electrically connected to each electronic device 16.

Alternatively, the electronic devices 16 can each have an independent electrical power input 12 capable of receiving electrical power from a 110 volt A.C. power supply or 220 volt A.C. power supply and batteries to allow each electronic device 16 to be separated and operated near or away from a standard power supply. As shown in FIG. 5, a power cord is used as the electrical power input 12 to electrically connect the electronic device 16 to a 110 A.C. volt power supply (not shown). Additionally, a battery compartment 23 can be used as an electrical power input 12 to hold one or more batteries (not shown).

The antenna 14 can be a telescoping antenna 14 or any size or shape antenna 14 capable of receiving electromagnetic waves. Moreover, each antenna can be hinged 24. The combination radio 10 can have one antenna 14 or, alternatively, each independent electronic device 16 can have an independent: antenna 14 so that each device 16 can be operated when the electronic devices 16 are separated.

Each electronic device 16 typically include a radio receiver 26, at least one speaker 28, and a set of electronic controls 30 including a tuner control 32 for turning the radio receiver 26 so that each electronic device 16 can be independently tuned to receive a signal from a radio station and each can independently generate audible sound.

In other embodiments, each independent electronic device 16 can include at least an audible sound reproducer 18 and/or a television (not shown). The audible sound reproducer 18 can be a cassette tape player, a compact disc player, an eight-track player, or any other device capable of reproducing audible sound from a recorded medium.

The radio receiver 26 is commonly known by those skilled in radio technology art and can be any radio receiver 26 capable of receiving a radio frequency. The speakers 28 utilized are standard speakers which are commonly known within the skill of the art. Each independent electronic device 16 can have multiple speakers 28.

The set of electronic controls 30 on each electronic device 16 can depend upon the type of electronic device 16 utilized and the control features desired for that electronic device 16. For example, the electronic controls 30 can include an on/off switch 34, a volume control adjustment 36, and a tuner control 32 for a radio receiver 26. Additionally, the electronic controls 30 can include a play button 38, a fast forward button 40, rewind button 42, record button 44, switch tape side button 46, and pause button 48 for an audible sound reproducer 18 such as a cassette tape player, all of which are commonly known and within the skill of the art.

Referring to FIG. 8, two electronic devices 16a, 16b can be housed in one housing 52 and be inseparable. In this embodiment, the single housing 52 houses both the first and second electronic devices 16a, 16b. A single housing 52 containing two electronic devices 16a, 16b can be used as a home radio, a portable radio, an automotive radio, a boat radio, or many other uses where the ability to listen to two radio stations simultaneously is desired. Similarly, two electronic devices 16a, 16b can be housed in one housing 52 with the speakers 28 and antenna 14 being remotely mounted.

Preferably, however, each electronic device is disposed in a separate housing 52 which can be removably attached together by the attacher 20. This method is preferred since the combination radio 10 can be separated to establish two independent electronic devices 16 which can be used independently at different locations. Referring to FIG. 7, the first electronic device 16 is housed in a first housing 52a, the second electronic device 16b is housed in a second housing and the third electronic device 16c is housed in a third housing 52c.

As shown in the drawings, each housing 52 can be a rectangular box having a front side 54a, a backside 54b, opposed sides 54c and 54d, a top 54e, and a bottom 54f. Alternatively, the housing 52 can be any shape capable of containing the electronic device 16. In the embodiment shown in the drawings, the speakers 28, the set of electronic controls 30 and the audible sound reproducer 18 are mounted on the front side 54a of each electronic device 16. In alternate embodiments, the speakers 28 can be remotely mounted away from the housing 52. The antenna 14 is mounted on the top 54e and the electrical power input 12 is on the back side 54b. Alternatively, the antenna 14 can be remotely mounted. Each housing 52 can also include a vent 56 located on the backside 54b to allow the flow of air into the housing 52 to dissipate heat generated by the electronic device 16 and prevent overheating.

The attacher 20 can be any device capable of securely and removably holding the separate housings 52 together. In the embodiment shown in the drawings, the attacher 20 can comprise a projection 58 extending from the first housing 52a and a corresponding receiver 60 for receiving the projection extending from the second housing 52b. The receiver 60 being sized and shaped to slidely receive the projection 58.

The projection 58 can be a male rail extending from one of the opposed sides 54c of the first housing 52a and the receiver 60 can be a corresponding female hook extending from one of the opposed sides 54d of the second housing 52b. Additionally, a male 62a/female 62b sliding latch 62 mounted perpendicular to the projection 58 can be used to inhibit the housings 52 from sliding apart. Alternatively, the attacher 20 can be a latch or other mechanism capable of removably attaching the individual housings 52.

Preferably, each housing 52 has a projection 58 extending from one of the opposed sides 54c and a corresponding receiver 60 extending from the other opposed side 54d of each of the housings 52. This embodiment is preferred so that multiple electronic devices 16 can be attached together to allow for increased volume potential from the combination radio 10.

The combination radio 10 can include a handle 64 capable of allowing the combination radio 10 to be carried. As shown in the drawings, each electronic device 16 can have an individual handle 64 attached to the respective housing 16 or, one handle could be utilized for the combination radio 10. Preferably, the handle 64 is pivotally attached by hinges (not shown) to reduce the size of the combination radio 10 when it is not being moved.

The synchronizer 22 can be any device or circuit capable of tuning two or more of the radio receivers 26 to the same frequency for receiving a signal from a single radio station so that the sound generated by the otherwise independent electronic devices 16 can be combined. The synchronizer 22 can be implemented in a variety of ways that are within the skill of those in radio receiver 26 and tuner control 32 arts.

The synchronizer 22 can comprise a switch 74 which bypasses the first tuner control 32a on the first electronic device 16a and causes the radio receivers 26 of the first and second electronic devices 16a, 16b to be operated by the second tuner control 32b.

For example, each tuner control 32 can be a voltage controlled tuner, and the switch 74 can have two selective positions defining "local" and "remote" modes of the radio receiver 26 of the first electronic device 16a. The switch 74 having a common connection to the radio receiver 26 of the first electronic device 16a and selective connections to the first tuner control 32a and the second tuner control 32b through an interconnector 66, which electrically connects the second tuner control 32b to the switch 74.

The switch 74 electrically connects the radio receiver 26 of the first electronic device 16a to the first tuner control 32a when the switch 74 is in the "local" mode. Similarly, the switch 74 electrically connects the radio receiver 26 of the first electronic device 16a to the second tuner control 32b through the interconnector 66 when the selective position of the switch 74 is in the "remote" mode. Thus, when the switch 74 is in the "local" mode, the radio receiver 26 of the first electronic device 16a is operated by the first tuner control 32a. Similarly, when the selective position of the switch 74 is in the "remote" mode, the radio receiver 26 of the first electronic device 16a is operated by the second tuner control 32b.

Alternatively, the synchronizer 22 can comprise a switch 74 which bypasses the first set of electronic controls 30a of the first electronic device 16a and causes the first and second electronic devices 16a, 16b to be operated by the second set of electronic controls 30b. This can be implemented in a variety of ways that are within the skill of those in radio receiver 26 and electronic control 30 arts.

For example, the switch 74 can have selected positions defining "local" and "remote" modes of the radio receiver 26 of the first electronic device The switch 74 having a common connection to the radio receiver 26 of the first electronic device 16a and selective connections to the first set of electronic controls 30a and the second set of electronic controls 30b through an interconnector 66, which electrically connects the second set of electronic controls 30b to the switch 74.

The switch 74 electrically connects the radio receiver 26 of the first electronic device 16a and the first set of electronic controls 30a when the selective position of the switch 74 is in the "local" mode. Alternatively, the radio receiver 26 of the first electronic device 16a is connected to the second set of electronic controls 30b through the interconnector wires 66 when the selective position of the switch 74 is in the "remote" mode. Thus, when the selective position of the switch 74 is in the "local" mode, the radio receiver of the first electronic device 16a is operated by the first set of electronic controls 30a. Similarly, when the switch 74 is in the "remote" mode, the radio receiver 26 of the first electronic device 16a is operated by the second set of electronic controls 30b.

The switch 74 can be a push button switch, a rotating switch, or any type of switch capable of redirecting the flow of current as described herein. Further, the switch 74 can be implemented with a third selective position defining a "master" mode. When the switch 74 is activated in the "master" mode, the switch 74 provides a pulse which drives counterpart switches 74 of the other electronic devices 16 into the "remote" mode. In this embodiment, when the switch 74 of the first electronic device 16a is put in the "master" mode, the other electronic devices 16 interconnected to the first electronic device 16a will be controlled by the first electronic device 16a.

As shown in FIG. 4, the interconnector 66 can be a wire 69 that is terminated by a male plug 70 which extends from the first electronic device 16a and is inserted into a corresponding female receptacle 72 of the second electronic devices 16b. Depending on the design of the synchronizer 22, the wire 69 can be electrically connected to the switch 74 of the first electronic device 16a and the female receptacle 72 being electrically connected to either the second tuner control 32b or the second set of electronic controls 34b.

Alternatively, the interconnector 66 can be sliding female and male connector members (not shown) that make contact when the housings 52 are attached by the attacher 20. For example, the projection 60 and the receiver 58 can be conductive members and the electronic devices 16 become electronically connected as electronic devices 16 are attached.

If each electronic device 16 is disposed in one unit, the combination radio 10 cannot be separated and one electrical power input 12 and antenna 14 can be used for both electronic devices 16.

Alternatively, each electronic device 16 can be disposed in a separate housing 52 with each electronic device 16 having its own power input 12 and antenna 14. The electronic devices 16 can be attached together using an attacher 20 to form a combination radio 10 or separated to allow the electronic devices 16 to be used at independent locations.

In operation, each electronic device 16 can be individually tuned to receive a separate radio frequency to allow the user to listen to two or more independent stations at one time. Similarly, in some embodiments, the user can simultaneously listen to a cassette tape and a radio station independently, or listen to two different cassette tapes at one time or watch television while listening to a radio station.

If a user desires increased volume, two or more radios can be attached together using the attacher 20 with the radios synchronized on the same radio frequency so that the sound output of each radio could be multiplied. In this embodiment, multiple electronic devices 16 can be attached and synchronized to create one large radio for parties or outdoor events.

Thus, the present invention provides a combination radio 10 which is useful for allowing the user to listen to two or more different radio frequencies at one time, or to synchronize two or more radio receivers 26 on one radio signal to combine the output of each individual radio.

Although the present invention has been described in considerable detail with reference to the certain preferred versions, many other versions should be apparent to those skilled in the art. For example, each independent electronic device 16 can include a headphone jack. Also, the two devices can have different power outputs. Therefore, the spirit and scope of the appended claims should not necessarily be limited to the description of the preferred versions contained therein.

What is claimed is:

1. An integral dual radio comprising:
   (a) an electrical power input;
   (b) an antenna;
   (c) a first independent electronic device for generating audible sound, the first independent electronic device having a first radio receiver, a first set of electronic controls including a first tuner control for tuning the first receiver, and at least one first speaker;
   (d) a second independent electronic device for generating audible sound, the second independent electronic device having a second radio receiver for receiving a radio signal independent of the first radio receiver, a second set of electronic controls including a second tuner control for tuning the second receiver to the same or different radio frequency as the first receiver, and at least one second speaker; the second independent electronic device generates audible sound through the second speaker which is independent of the first independent electronic device; and
   (e) a single, housing means enclosing and fixedly attached to the first radio receiver, the first set of electronic controls, the second radio receiver, and the second set of electronic controls;
   wherein the electrical power input and the antenna are electrically connected to the first and second independent electronic devices.

2. The dual radio of claim 1 wherein the electrical power input comprises a compartment capable of receiving at least one battery.

3. The dual radio of claim 1 wherein at least one of the independent electronic devices further comprises at least one audible sound reproducer for reproducing audible sound from a recorded medium.

4. An integral dual radio comprising:
   (a) an electrical power input;
   (b) an antenna;
   (c) a first independent electronic device for generating audible sound, the first independent electronic device having a first radio receiver, a first set of electronic controls including a first tuner control for tuning the first receiver, and at least one first speaker;
   (d) a second independent electronic device for generating audible sound, the second independent electronic device having a second radio receiver for receiving a radio signal independent of the first radio receiver, a second set of electronic controls including a second tuner control for tuning the second receiver to the same or different radio frequency as the first receiver, and at least one second speaker; the second independent electronic device generates audible sound through the second speaker which is independent of the first independent electronic device; and
   (e) a single, housing enclosing and fixedly attached to the first radio receiver, the first set of electronic controls, the second radio receiver, and the second set of electronic controls;
   wherein the electrical power input and the antenna are electrically connected to the first and second independent electronic devices;
   wherein the dual radio further comprises a selectively activated synchronizer switch for synchronizing the first and second radio receivers to the same frequency so that the sound generated from the first and second independent electronic devices is combined when the synchronizer switch is activated.

5. The dual radio of claim 4 wherein the synchronizer switch, when activated, bypasses the first set of electronic controls and causes the first radio receiver to be operated by the second set of electronic controls.

6. The dual radio of claim 4 wherein the synchronizer switch when activated bypasses the first tuner control on the first independent electronic device and causes the first radio receiver to be operated by the second tuner control.

7. A dual radio comprising:
   (a) a first independent electronic device for generating audible sound, the first independent electronic device having a first radio receiver, a first set of electronic controls including a first tuner control for tuning the first radio receiver, at least one first speaker, a first electrical power input and a first antenna;
   (b) a first housing for housing the first independent electronic device;
   (c) a second independent electronic device for generating audible sound, the second independent electronic device having a second radio receiver for receiving a radio signal independent of the first radio receiver, a second set of electronic controls including a second tuner control for tuning the second receiver to the same or different radio frequency as the first receiver, and at least one second speaker, a second electronic power input, and a second antenna; the second independent electronic device generates audible sound through the second speaker which is independent of the first independent electronic device;
   (d) a second housing for housing the second independent electronic device;
   (e) an attacher for removably attaching the first housing to the second housing; and
   (f) a selectively activated synchronizer switch in the first housing for synchronizing the radio receivers to the same frequency so that the sound generated by each of the electronic devices is combined when the synchronizer switch is activated.

8. The dual radio of claim 7 wherein at least the first electronic power input comprises a compartment for receiving at least one battery.

9. The dual radio of claim 7 wherein at least one of the electronic devices further comprises an audible sound reproducer for reproducing audible sound from a recorded medium.

10. The combination dual radio of claim 7 wherein the synchronizer switch, when activated, bypasses the first set of electronic controls and causes the first radio receiver to be operated by the second set of electronic controls.

11. The combination radio of claim 7 wherein the synchronizer switch, when activated, bypasses the first tuner control on the first electronic device and causes both radio receivers to be operated by the second tuner control.

12. The dual radio of claim 7 wherein the attacher comprises a projection extending from the first housing and a receiver extending from the second housing for receiving the projection.

13. The dual radio of claim 7 further comprising:
   (a) a third independent electronic device for generating audible sound, the third independent electronic device having a third radio receiver, a third set of electronic controls, including a third tuner control for tuning the third radio receiver, at least one speaker, an antenna and a third electrical power input; and (b) a third housing for housing the third electronic device and a second attacher;

wherein the second attacher removably attaches the third housing to the first and second housing;

wherein the synchronizer switch, when activated, synchronizes the first, second and third radio receivers on the same frequency so that the sound generated by each of the electronic devices is combined;

14. A dual radio comprising:

(a) a first independent electronic device for generating audible sound, the first independent electronic device having a first radio receiver, a first audible sound reproducer for reproducing audible sound from a recorded medium, a first set of electronic controls including a first tuner control for tuning the first radio receiver, at least one first speaker, a first electrical power input, and a first antenna;

(b) a first housing for housing the first independent electronic device;

(c) a second independent electronic device for generating audible sound, the second independent electronic device having a second radio receiver for receiving a radio signal independent of the first radio receiver, a second set of electronic controls including a second tuner control for tuning the second receiver to the same or different radio frequency as the first radio receiver, and at least one second speaker, a second electrical power input, and a second antenna; the second independent electronic device generates audible sound through the second speaker which is independent of the first independent electronic device;

(d) a second housing for housing the second independent electronic device;

(e) an attacher for removably attaching the first housing to the second housing, the attacher comprising a projection extending from the first housing and a receiver extending from the second housing for receiving the projection; and (f) a selectively activated synchronizer switch in the first housing which when activated synchronizes the two radio receivers to the same frequency so that sound generated by each of the electronic devices is combined.

15. The dual radio of claim 14 wherein the synchronizer switch, when activated, bypasses the first set of electronic controls and causes the first radio receiver to be operated by the second set of electronic controls.

16. The dual radio of claim 14 wherein the synchronizer switch, when activated, bypasses the first tuner control causes both radio receivers to be operated by the second tuner control.

17. An integral dual radio comprising:

(g) an electrical power input;

(h) an antenna;

(i) a first independent electronic device for generating audible sound, the first independent electronic device having a first radio receiver, a first set of electronic controls, including a first tuner control for tuning the first receiver, and at least one first speaker;

(j) a second independent electronic device for generating audible sound, the second independent electronic device having a second radio receiver for receiving a radio signal independent of the first radio receiver, a second set of electronic controls including a second tuner control for tuning the second receiver to the same or different radio frequency as the first receiver, and at least one second speaker; the second independent electronic device generates audible sound through the second speaker which is independent of the first independent electronic device; and (k) a single housing enclosing and fixedly attached to the first radio receiver, the first set of electronic controls, the second radio receiver, and the second set of electronic controls;

wherein the electrical power input and the antenna are electrically connected to the first and second independent electronic devices;

wherein the dual radio further comprises a selectively activated synchronizer switch, which, when activated, causes the first and second speakers to generate audible sound at the same frequency.

* * * * *